July 31, 1934. R. STRAUBEL 1,968,267
OPTICAL INSTRUMENT
Filed Aug. 2, 1932
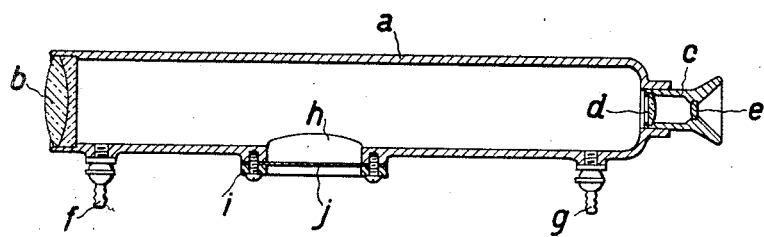
Inventor:
Rudolf Straubel Patented July 31, 1934

1,968,267

UNITED STATES PATENT OFFICE 1,968,267

OPTICAL INSTRUMENT

Rudolf Straubel, Jena, Germany, assignor to the firm Carl Zeiss, Jena, Germany

Application August 2, 1932, Serial No. 627,292
In Germany August 15, 1931

2 Claims. (Cl. 88—32)

The invention concerns optical observation instruments, for instance telescopes. The efficiency of these instruments, especially with respect to image quality, is influenced by the medium which the light rays have to traverse outside as well as inside the instrument being inhomogeneous, this inhomogeneity being due to unequal densities and the like or, in other words, to the fact that the refractive index of the medium is different at different places.

It has been tried to overcome this inconvenience by evacuating the air from the interior of the instrument, a method which proved not to be advisable in practice.

According to the invention the efficiency of an optical instrument is improved by considerably reducing the inhomogeneity of the medium within the instrument, this reduction being effected by filling the instrument not with air but, entirely or partly, with helium, that is to say with gas of a refractive index considerably inferior to that of air. Furthermore, the fact that helium has a thermal conductivity surpassing that of air is of great advantage with respect to the compensation of the said inhomogeneity.

In the case of instruments having not only fixed but also movable or replaceable optical members it is convenient to fill with helium only the space between the fixed members or to make use of a special closing organ, for instance a glass plate.

With a view to avoid that changes of temperature produce changes of pressure in the instrument, which may cause an escape of helium or an admission of air, it is advisable to use a compensating device.

The accompanying drawing represents schematically an example of the invention in a longitudinal section.

A telescope tube $a$ has at one end an objective $b$ and at its other end an adjustable ocular $c$ consisting of two lenses $d$ and $e$. Near its ends, the tube $a$ is provided with cocks $f$ and $g$ for gas supply and air discharge. An aperture $h$ in the side of the tube is provided with a ring $i$ holding a rubber disc $j$ for pressure compensation.

I claim:

1. An optical observation instrument comprising a tube, an objective and an ocular fitted to this tube, at least part of the interior of the tube being filled with helium.

2. An optical observation instrument comprising a tube, an objective and an ocular fitted to this tube, at least part of the interior of the tube being filled with helium, a pressure compensating device being provided on the instrument and connected to the interior of the said tube.

RUDOLF STRAUBEL.